United States Patent
Hamamatsu et al.

(10) Patent No.: US 7,423,094 B2
(45) Date of Patent: Sep. 9, 2008

(54) LIGHT-DIFFUSING POLYCARBONATE RESIN COMPOSITION

(75) Inventors: Toyohiro Hamamatsu, Niihama (JP); Tomohiro Maekawa, Niihama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 149 days.

(21) Appl. No.: 11/230,666

(22) Filed: Sep. 21, 2005

(65) Prior Publication Data

US 2006/0069215 A1    Mar. 30, 2006

(30) Foreign Application Priority Data

Sep. 30, 2004    (JP)    ............................ 2004-286814

(51) Int. Cl.
C08L 69/00    (2006.01)
(52) U.S. Cl. .................................... 525/464
(58) Field of Classification Search .................. 525/464

See application file for complete search history.

(56) References Cited

U.S. PATENT DOCUMENTS

| | | | |
|---|---|---|---|
| 5,352,747 A | | 10/1994 | Ohtsuka et al. |
| 5,556,908 A | * | 9/1996 | Chung et al. ................. 524/493 |
| 5,728,765 A | * | 3/1998 | Chung et al. ................. 524/494 |
| 5,773,134 A | * | 6/1998 | Inokuchi et al. ............. 428/220 |
| 6,556,347 B1 | * | 4/2003 | Murayama et al. .......... 359/453 |
| 2003/0228481 A1 | * | 12/2003 | Maekawa .................... 428/522 |
| 2004/0066645 A1 | * | 4/2004 | Graf et al. ..................... 362/31 |

FOREIGN PATENT DOCUMENTS

| | | |
|---|---|---|
| JP | 2004-029091 A | 1/2004 |
| JP | 2004-126185 A | 4/2004 |

OTHER PUBLICATIONS

U.S. Appl. No. 11/230,674, filed Sep. 21, 2005 to T. Hamamatsu et al.

* cited by examiner

*Primary Examiner*—David Buttner
(74) *Attorney, Agent, or Firm*—Sughrue Mion, PLLC

(57) ABSTRACT

A composition comprising a polycarbonate resin and a silicone rubber particle having a weight average particle diameter of from about 0.5 μm to about 10 μm is provided. The composition has high impact resistance and is less colored. The sheet obtained by molding the composition is useful as a light-diffusing sheet.

4 Claims, No Drawings

LIGHT-DIFFUSING POLYCARBONATE RESIN COMPOSITION

BACKGROUND OF THE INVENTION

1. Field of the Invention

The present invention relates to a light-diffusing polycarbonate resin composition.

2. Description of the Related Art

A polycarbonate resin is known as a resin having both of high impact resistance and high light transmittance and, as a composition to which light diffusivity is imparted, a polycarbonate resin composition in which a silicone resin particle is dispersed is also known (see, Japanese Patent Application Laid-Open No. 6-192556).

However, the conventional polycarbonate resin composition in which a silicone resin particle is dispersed may slightly become colored in some cases.

SUMMARY OF THE INVENTION

The present inventors have intensively studied in order to develop a composition having high impact resistance and light diffusivity as well as being less colored. As a result, it has been found that such a light-diffusing composition can be obtained using a silicone rubber particle and a polycarbonate resin. The present invention has been accomplished based on the findings.

The present invention provides a light-diffusing polycarbonate resin composition comprising a polycarbonate resin and a silicone rubber particle having a weight average particle diameter of about 0.5 μm to about 10 μm.

The light-diffusing polycarbonate resin composition of the present invention is a composition with less colored, maintaining high impact resistance and high light diffusivity of polycarbonate resin.

DETAILED DESCRIPTION OF THE PREFERRED EMBODIMENTS

A light-diffusing polycarbonate resin composition of the present invention comprises a polycarbonate resin and a silicone rubber particle having a weight average particle diameter of about 0.5 μm to about 10 μm.

A polycarbonate resin used in the present invention can be prepared by known methods such as a phosgene method (solution method) of reacting bisphenol A and phosgene; a transesterification method (melting method) of reacting bisphenol A and diphenyl carbonate; and the like (see, "Plastic Guideline", revised 14th edition, published by Plastic Age on May 10, 1985, pp. 152-153). Upon preparation, a catalyst, a terminator and/or an antioxidant may be used. The polycarbonate resin may be a branched polycarbonate resin in which a tri- or more-functional (i.e., polyfunctional) aromatic compound is copolymerized, or a polyester carbonate resin in which an aromatic or aliphatic bifunctional carboxylic acid is copolymerized. Two or more kinds of polycarbonate resins may be used together.

A silicone rubber particle used in the present invention comprises a silicone rubber. The silicone rubber particle has elasticity. For example, even when a load of 30 N/mm$^2$ is applied per cross-sectional area of a particle, the particle rarely cracks or collapses due to the elasticity.

A refractive index of the silicone rubber particle is preferably in the range of from about 1.35 to about 1.5 in view of sufficiently high light diffusivity of the resulting resin composition.

A weight average particle diameter of the silicone rubber particle is in the range of from about 0.1 μm to about 10 μm, and is preferably in the range of from about 1 μm to about 5 μm. When the weight average particle diameter is less than about 0.1 μm, the resulting resin composition may be difficult to attain sufficiently light diffusivity. When the weight average particle diameter exceeds about 10 μm, light transmittance and impact resistance of the resulting resin composition tend to be lowered. The weight average particle diameter of the silicone rubber particles can be measured as and corresponds to a D50 value of the particles measured by a light diffusion/scattering particle diameter measuring instrument (for example, a microtrack particle size distribution analyzer; Model 9220 FRA, manufactured by Nikkiso Co., Ltd.)

The silicone rubber particle may be a particle of a silicone rubber having an organic group bonded to a silicon atom in siloxane bonds of the main structure thereof. Examples of the organic group include an alkenyl group such as a vinyl group and an allyl group; an alkynyl group such as an ethynyl group and a propargyl group; an ether group such as a methoxy group, an ethoxy group and a phenoxy group; an acyl group such as a formyl group, an acetyl group, a benzoyl group, an acryloyl group and a methacryloyl group; a carboxy group; an ester group such as an acetoxy group, a methacryloyloxy group, an acryloyloxy group, a methoxycarbonyl group and an ethoxycarbonyl group; a cyano group; a cyanatho group; and a glycidyl group. Among them, an alkenyl group, analkynyl group, analkoxyl group, anacyl group, an ester group and a glycidyl group are preferable, since the silicone rubber particle with such a group can be uniformly dispersed in a polycarbonate resin. A methacryloyloxy group is more preferable.

The silicone rubber particle may be commercially available silicone rubber particle. Examples of the commercially available silicone rubber particle include "DY33-719" (having a methacryloyloxy group, manufactured by Dow Corning Toray Silicone Co., Ltd.), "DY33-708" (having has a vinyl group, manufactured by the same company), "E-600" and "E-850" (each having a methyl group, manufactured by the same company), "E-601" (having a glycidyl group, manufactured by the same company), "E500" and "E604" (manufactured by the same company).

The amount of a silicone rubber particle contained in the composition of the present invention may be in the range of from about 0.01 part by weight to about 10 parts by weight, and is preferably in the range of from about 0.05 part by weight to about 5 parts by weight, on the basis of 100 parts by weight of a polycarbonate resin contained together in the composition. When the amount is less than about 0.01 part by weight, the resulting composition may be difficult to attain sufficiently high light diffusivity. When the amount exceeds about 10 parts by weight, impact resistance and light transmittance of the resulting composition tends to be lowered.

The light-diffusing polycarbonate resin composition of the present invention may contain a light-diffusing agent other than the above-mentioned silicone rubber particle, as long as the presence (or the amount thereof) of the additional agent does not provide adverse effects. Examples of such a light-diffusing agent include particles of titanium oxide, barium sulfate, calcium carbonate, aluminum hydroxide, talc or mica; glass beads; crosslinked acryl resin beads; crosslinked styrene resin beads; and silicone resin particles.

Further, the light-diffusing polycarbonate resin composition of the present invention may contain an additive such as a flame-retardant, a flame-retardant assistant, a thermal stabilizer, a mold releasing agent, an ultraviolet-ray absorbing agent, a fluorescent brightening agent, a bluing agent, a light stabilizer, an oxidation-preventing agent and an antistatic agent.

Examples of the flame-retardant which may be contained in the light-diffusing polycarbonate resin composition of the present invention include tetrabromobisphenol A, low-molecular polycarbonate of tetrabromobisphenol A and decabromodiphenylene ether. Examples of the flame-retardant assistant which may be contained in the composition include antimony trioxide.

In order to suppress reduction in a molecular weight and deterioration of a hue at molding, the phosphorus-containing thermal stabilizer may be contained in a light-diffusing polycarbonate resin composition of the present invention. Examples of the thermal stabilizer include a phosphorus-containing thermal stabilizer such as phosphorous acid, phosphoric acid, phosphonous acid, phosphonic acid and ester thereof. These thermal stabilizers may be used each singly or in a combination of two kinds or more of them. When the thermal stabilizer is contained, the amount thereof is preferably in the range of from about 0.001 part by weight to about 0.15 part by weight on the basis of 100 parts by weight of the polycarbonate resin in the composition.

In order for a light-diffusing polycarbonate resin composition of the present invention to have improved releasability from a mold at molding, the mold releasing agent such as an aliphatic carboxylate ester may be contained in the composition. When the aliphatic carboxylate ester is contained in the composition, the amount thereof is preferably in the range of form about 0.001 part by weight to about 0.5 part by weight on the basis of 100 parts by weight of the polycarbonate resin in the composition.

In order for a light-diffusing polycarbonate resin composition of the present invention to have improved weather resistance and high rate of blocking ultraviolet-ray, the ultraviolet-ray absorbing agent may be contained in the composition. Examples of the ultraviolet-ray absorbing agent include a triazole ultraviolet-ray absorbing agent, an acetophenone ultraviolet-ray absorbing agent, an salicylic acid ester ultraviolet-ray absorbing agent, a benzotriazole ultraviolet-ray absorbing agent, a benzophenone ultraviolet-ray absorbing agent, a triazine ultraviolet-ray absorbing agent, a cyanoacrylate ultraviolet-ray absorbing agent, a propanemalonic acid ester ultraviolet-ray absorbing agent and an oxalanilide ultraviolet-ray absorbing agent. These ultraviolet-ray absorbing agents may be used each singly or in a combination of two kinds or more of them. When the ultraviolet-ray absorbing agent is contained, the amount thereof may be in the range of form about 0.01 part by weight to about 2 parts by weight, and is preferably in the range of form about 0.05 part by weight to about 1 part by weight, on the basis of 100 parts by weight of the polycarbonate resin contained in the composition.

When the light-diffusing polycarbonate resin composition of the present invention contains an ultraviolet-ray absorbing agent, the composition may also contain a fluorescent brightening agent together in order to decrease coloration due to the ultraviolet-ray absorbing agent. A fluorescent brightening agent may have an ability of absorbing ultraviolet-ray and radiating the absorbed ultraviolet-ray as visible light. The fluorescent brightening agent is not particularly limited as long as the agent has such an ability and improves a tone of the polycarbonate resin composition. Examples of the fluorescent brightening agent include a stilbenzene fluorescent brightening agent, a benzimidazole fluorescent brightening agent, a benzoxazole fluorescent brightening agent, a naphthalimide fluorescent brightening agent, a rhodamine fluorescent brightening agent, a coumarin fluorescent brightening agent, and an oxazine fluorescent brightening agent. When the fluorescent brightening agent is contained, the amount thereof may be in the range of from about 0.0005 part by weight to about 0.1 part by weight, and is preferably may be in the range of from about 0.001 parts by weight to about 0.05 part by weight, on the basis of 100 parts by weight of the total amount of the polycarbonate resin and the silicone rubber particle in the composition. Although not outside the scope of the present invention, when the amount of the fluorescent brightening agent is less than about 0.0005 part by weight, the improvement in tone of the resulting composition may be insufficient. Also again while not outside the scope of the present invention, when an ultraviolet-ray absorbing agent is used and the amount of the fluorescent brightening agent exceeds about 0.1 part by weight, the tone of the composition may be difficult to be uniform, and also the cost may be high, undesirably.

The light-diffusing polycarbonate resin composition of the present invention may contain a bluing agent. The bluing agent can decrease coloration due to the ultraviolet-ray absorbing agent, if any. The bluing agent may be a commonly-utilized one for a polycarbonate resin. When the bluing agent is contained, the amount thereof may be in the range of from about $0.3 \times 10^{-4}$ part by weight to about $2 \times 10^{-4}$ part by weight on the basis of 100 parts by weight of the polycarbonate resin in the composition.

The light-diffusing polycarbonate resin composition of the present invention can be prepared, for example, by a method of melting and kneading a polycarbonate resin and a silicone rubber particle.

Since the light-diffusing polycarbonate resin composition of the present invention maintains high impact resistance of a polycarbonate resin and is less colored, a sheet obtained by molding the composition is useful as a light-diffusing sheet.

A method of molding the light-diffusing polycarbonate resin composition into a light-diffusing sheet is not particularly limited, and can be a known method for molding a polycarbonate resin. Examples of the molding method include a method of melting and kneading the light-diffusing polycarbonate resin composition of the present invention and molding the resultant into a sheet-like form by a molding method such as an extrusion molding method, an injection molding method and a press molding method. Alternatively, a light-diffusing sheet obtained from the light-diffusing polycarbonate resin composition of the present invention may be produced in a laminate comprising the light-diffusing sheet and a substrate by the method of applying a solution of the light-diffusing polycarbonate resin composition dissolved in a solvent onto a surface of the substrate, and volatilizing the solvent to prepare the sheet on the substrate.

Two or more of the thus-obtained light-diffusing sheets may be piled and melt-laminated by thermal pressing to obtain a laminate comprising the light-diffusing sheets. The light-diffusing sheet and the laminate of the sheets may be laminated on a substrate by a method of laminating the light-diffusing sheet(s) with a pressure-sensitive adhesive or an adhesive, or a method of performing melt-lamination by thermal pressing.

Thus, a light-diffusing sheet comprising the light-diffusing polycarbonate resin composition of the present invention can be obtained. Since the light-diffusing sheet in the present invention maintains high impact resistance of a polycarbonate resin and is less colored as mentioned above, the sheet can be suitably used as a signboard including an illumination signboard, an illumination cover, a show case and a light-diffusing plate which is incorporated into a transmission-type display device. In particular, the sheet can be suitably used as a light-diffusing member which is used together with a light source for diffusing light from the light source, such as a signboard including an illumination signboard, an illumination cover and a light-diffusing plate in a transmission-type display device.

Examples of the light-diffusing plate in a transmission-type display device include a light-diffusing plate for a backlight in a liquid crystal display device. Examples of the backlight include an edge-light-type backlight. Examples of a light source of the backlight include a LED light source, and a cold cathode tube. Since a light-diffusing sheet made from the light-diffusing polycarbonate resin composition of the present invention is excellent in light diffusivity, the sheet can be also preferably used in a light source device in which a distance between a light source and a light-diffusing member is as short as 3 mm to 50 mm.

The invention being thus described, it will be apparent that the same may be varied in many ways. Such variations are to be regarded as within the spirit and scope of the invention, and all such modifications as would be apparent to one skilled in the art are intended to be within the scope of the following claims.

The entire disclosure of the Japanese Patent Application No. 2004-286814 filed on Sep. 30, 2004, including specification, claims and summary, are incorporated herein by reference in their entirety.

EXAMPLES

The present invention is described in more detail by following Examples, which should not be construed as a limitation upon the scope of the present invention.

Compression test of the particles used in Examples and Comparative Examples was conducted as follows:

(1) Compression Test of Particles

Using a Shimadzu fine compression tester ("MCTM/MCTE series" manufactured by Shimadzu Corporation), a load was applied to one particle with an indenter having a diameter of 50 μm, and the load was increased at a rate of 0.142 mN/sec. When a load per unit cross-sectional area reached 30 N/mm$^2$, appearance of the particle was observed by naked eyes.

Light-diffusing sheets obtained in Examples and Comparative Examples were evaluated as follows:

(2) Total Light Transmittance (Tt):

According to ASTM D1003-61, the transmittance was measured with a Poic integrating sphere-type hazemeter ("SEP-HS-30D" manufactured by Nippon Precision Optical Instruments Co., Ltd.).

(3) Hiding Property ($I_5/I_0$) and Light Diffusibility ($I_{70}/I_0$):

Hiding property ($I_5/I_0$) and light diffusibility ($I_{70}/I_0$) were measured by using a automatic goniophotometer ['GP-1R' manufactured by MURAKAMI COLOR RESEARCH LABORATORY] under the conditions that the intensity of the transmitted light at a transmission angle of 0° by vertical incident light was to be as $I_0$, and the intensities of the transmitted light at a transmission angle of 5° and 70° by vertical incident light was to be as $I_5$ and $I_{70}$, respectively.

(4) Yellow Degree (YI):

Using a spectrophotometer ("U4000 type" manufactured by Hitachi, Ltd.), light transmittance was measured at 1 nm intervals in a range of a wavelength of from 300 nm to 800 nm to obtain XYZ value in accordance with JIS Z-8722. Based on the XYZ value, a yellow degree (YI) was obtained in accordance with JIS K-7105. A smaller yellow degree (YI) indicates that the evaluated light-diffusing sheet is less colored.

(5) Impact Resistance:

Ten (10) test pieces of 40 mm×40 mm×1 mm were obtained by cutting off each of the light-diffusing sheets to be evaluated. Impact resistance test was conducted in accordance with JIS K5400, using a DuPont-type falling impact tester (manufactured by Yasuda Seiki Seisakusho, Ltd.), in which each of 10 pieces was held between a ¼ inch shooting-mold and a ¼ inch receiving-plate, and a 1000 g weight was fallen from a height of 100 cm above the shooting-mold. A number of uncracked pieces among 10 pieces after the impact resistance test was counted to evaluate impact resistance of the light-diffusing sheets. A larger number of the uncracked test pieces indicates that the evaluated light-diffusing sheet has a larger impact resistance.

Example 1

100 Parts by weight of a commercially available polycarbonate resin pellet ("SD1080" manufactured by Sumitomo Dow Limited.) and 2 parts by weight of commercially available silicone rubber particles ("DY33-719" manufactured by Dow Corning Toray Silicone Co., Ltd., having an average particle diameter of 2 μm and having a methacryloyl group on a surface) were mixed. The resulting mixture was melted and kneaded with an extruder, was extruded into a sheet at a resin temperature at a die exit of 230° C., and was then processed into a sheet having a thickness of about 0.5 mm and a width of about 3 cm, to obtain a light-diffusing sheet. In the same manner, three sheets of the light-diffusing sheet were obtained. The sheets were piled up and were thermally pressed with a thermal press-molding machine, to obtain a light-diffusing sheet having a thickness of 1 mm. The obtained light-diffusing sheet was evaluated. The results of the evaluation are shown in Table 1.

It is noted that in the above-described compression test, the silicone rubber particle used in Example 1 did not crack or collapse.

Example 2

A light-diffusing sheet having a thickness of 1 mm was obtained in the same manner as in Example 1 except that the amount of the silicone rubber particles was changed to be 0.5 part by weight. The obtained light-diffusing sheet was evaluated. The results of the evaluation are shown in Table 1.

Comparative Example 1

A light-diffusing sheet having a thickness of 1 mm was obtained in the same manner as in Example 1 except that 2 parts by weight of silicone resin particles ("Tospearl 120" manufactured by GE Toshiba Silicones, having an average particle diameter of 2 μm) were used instead of using the silicone rubber particles. The obtained light-diffusing sheet was evaluated. The results of the evaluation are shown in Table 1.

It is noted that in the above-described compression test, the silicone resin particle used in Comparative Example 1 cracked.

Comparative Example 2

A light-diffusing sheet having a thickness of 1 mm was obtained in the same manner as in Example 1 except that 2 parts by weight of crosslinked acryl particles ("Techpolymer MBX-5" manufactured by Sekisui Plastics Co., Ltd., having an average particle diameter of 5 μm) were used instead of using the silicone rubber particle. The obtained light-diffusing sheet was evaluated. The results of the evaluation are shown in Table 1.

Comparative Example 3

A standard sheet for reference having a thickness of 1 mm was obtained in the same manner as in Example 1 except that the silicone rubber particles were not used. The sheet was evaluated for reference, and the results of the evaluation are shown in Table 1.

TABLE 1

|  | Tt (%) | $I_5/I_0$ | $I_{70}/I_0$ | YI | Impact resistance (Number of uncracked test pieces) |
|---|---|---|---|---|---|
| Example 1 | 45 | 0.99 | 0.28 | 2.9 | 10 |
| Example 2 | 63 | 0.89 | 0.17 | 3.1 | 10 |
| Comparative Example 1 | 52 | 0.99 | 0.28 | 5.3 | 5 |
| Comparative Example 2 | 78 | 0.97 | 0.06 | 4.7 | 5 |
| Comparative Example 3 | 92 | 0 | 0 | 0.8 | 9 |

What is claimed is:

1. A light-diffusing polycarbonate resin composition comprising a polycarbonate resin and a silicone rubber particle having a weight average particle diameter of from about 0.5 μm to about 10 μm, wherein the silicone rubber particle is a particle of a silicone rubber having a methacryloyloxy group bonded to a silicon atom in siloxane bonds of the main structure thereof.

2. The light-diffusing polycarbonate resin composition according to claim 1, wherein the silicone rubber particle is contained in the composition in the amount of from 0.01 part by weight to 10 parts by weight on the basis of 100 parts by weight of the polycarbonate resin.

3. A process for producing a light-diffusing polycarbonate resin composition according to claim 1, the process comprising the steps of melting and kneading a polycarbonate resin and a silicone rubber particle having a weight average particle diameter of from about 0.5 μm to about 10 μm.

4. A light-diffusing sheet obtained by molding a light-diffusing polycarbonate resin composition according to claim 1.

* * * * *